Dec. 26, 1933.   W. E. DISNEY ET AL   1,941,341
METHOD AND APPARATUS FOR SYNCHRONIZING PHOTOPLAYS
Filed April 2, 1931   2 Sheets-Sheet 1

Inventors
Walter E. Disney
Wilfred E. Jackson
William E. Garity
By Lyon & Lyon
Attorneys Dec. 26, 1933.   W. E. DISNEY ET AL   1,941,341
METHOD AND APPARATUS FOR SYNCHRONIZING PHOTOPLAYS
Filed April 2, 1931   2 Sheets-Sheet 2
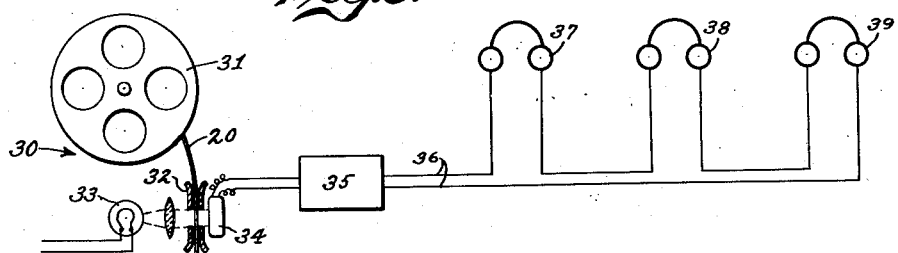
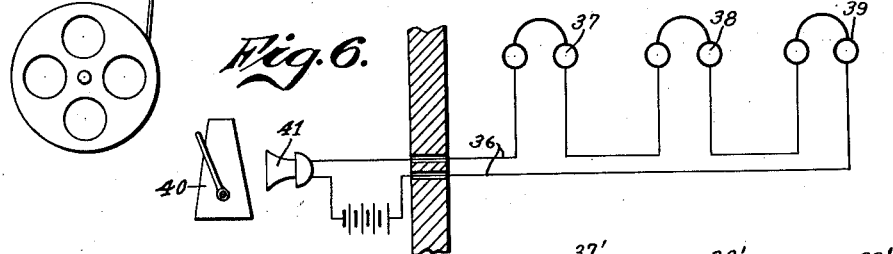
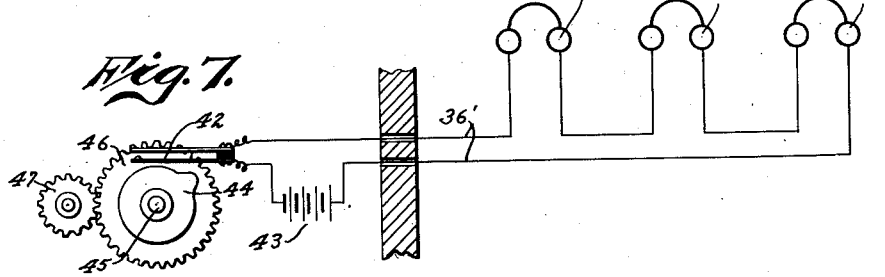
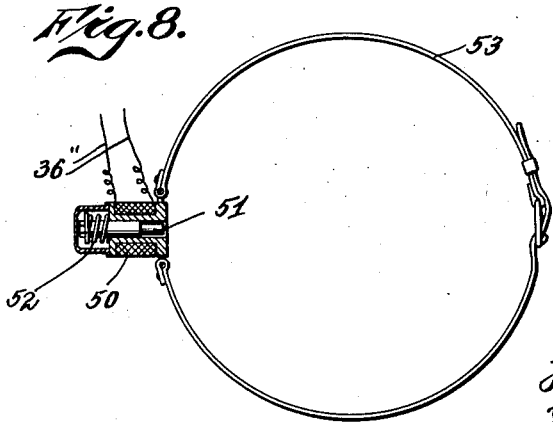
Inventors
Walter E. Disney
Wilfred E. Jackson
William E. Garity
By
Lyon & Lyon
Attorneys Patented Dec. 26, 1933

1,941,341

UNITED STATES PATENT OFFICE 1,941,341

METHOD AND APPARATUS FOR SYNCHRONIZING PHOTOPLAYS

Walter E. Disney, Los Angeles, Wilfred E. Jackson, Glendale, and William E. Garity, Los Angeles, Calif., assignors to Walt Disney Productions, Ltd., Los Angeles, Calif., a corporation of California Application April 2, 1931. Serial No. 527,170

8 Claims. (Cl. 88—16.2)

This invention relates to a method of preparing animated cartoon films with sound accompaniment synchronized therewith. The invention also relates to the preparation of any motion picture film in which sound effects or a musical score is to be synchronized with the movement of the actors or objects photographed pictorially or photographically on such motion picture film. The invention also relates to means whereby sound effects may be accurately and readily synchronized with a motion picture film.

In the interest of lucidity, particular reference will be had to the problems encountered in the preparation of animated cartoon films although, as has been stated hereinabove, this invention is not limited in its application to animated cartoon films but instead may be employed to great advantage wherever it is desired to produce a sound record synchronized with a motion picture film containing pictorial representations of objects or actors.

Animated cartoon films generally consist of pictorial representations depicting sequences of progressive steps of action, such cartoon films being generally made by depicting motion of the objects by means of individual drawings, such drawings naturally assuming sequences, the entire sequence depicting one step of the action. A sequence of drawings is merely a series of drawings in which progressive positions of one step of the action are depicted. If, for example, the cartoon film is to show a person taking a single step, the sequence of pictures depicting such single step would pictorially represent a succession of intermediate stages.

Since the advent of so-called talking pictures, attempts have been made to produce animated cartoon films with sound effects synchronized therewith. This has been particularly hard to do. When the ordinary motion picture play is photographed, the camera by which the action is photographically recorded, operates at a standard speed of say 24 frames per second. The recording machine runs at a linear speed identical to the camera speed. The speed at which the film in the camera is operated (and the film in the recording machine if this method is employed for recording scenes) is equivalent to the speed at which the finished film will run during projection or exhibition. Animated cartoon films, however, cannot be photographed at the same speed that an ordinary motion picture film can be photographed. In making animated cartoon films, thus the individual drawings are made and then these drawings are photographed one at a time.

Stop motion technique is employed. Furthermore, in the preparation of animated cartoon films with sound accompaniment, the sound effects must be separately recorded and it is extremely difficult to separately produce a sound record and a pictorial film with the assurance that the two when combined will be properly synchronized.

This invention has for its object the provision of a method of synchronizing sound effects with motion pictures whereby absolute synchronism is positively assured.

Another object of this invention is to disclose and provide a method of producing animated cartoon films with sound accompaniment synchronized therewith in which the sound accompaniment is synchronized with progressive steps of action depicted in the film.

Another object is to disclose and provide a method of preparing animated cartoon films correlated and synchronized with a predetermined musical score.

An object of the invention is to disclose and provide a method of preparing animated cartoon films from a predetermined musical score and a predetermined series of consecutive progressive steps of action whereby pictorial representations and the sound accompaniment may be separately recorded and subsequently combined, such combination of pictorial representations and sound recording being in perfect synchronization with each other.

Another object is to disclose and provide means whereby sound recordings may be produced in positive correlation to a proposed or existing motion picture.

A still further object is to disclose and provide a method of imparting time signals to musicians, actors and other sound sources during the preparation of sound accompaniments without superimposing the time beats upon the sound record being prepared.

Another object is to disclose and provide a method of aurally imparting time signals to musicians and other animated sound sources without causing such time signals to be superimposed upon the sound records being produced by said sound sources.

These and other objects, uses and advantages of this invention will become apparent to those skilled in the art from a consideration of the following detailed description.

In describing the invention, reference will be had to the appended drawings, in which Fig. 1 is a fragment of the musical score which it is desired to employ in an animated cartoon film.

Fig. 5 is one form of apparatus by means of which the musicians and others producing sounds to be recorded, are informed of the beat or timing required during the preparation of the sound record.

Figs. 6 and 7 disclose modified forms of apparatus adapted to aurally indicate to the musicians and other sound sources the required time.

Fig. 8 is a form of device for mechanically indicating to the musicians the required tempo.

In order to clearly describe the invention and advantages thereof, an outline of the methods employed in making animated cartoon film will be briefly described. The first step in preparing the animated cartoon film is to hold what is termed a "gag" meeting which is attended by the entire studio staff as well as the musical director. The general idea of the picture to be produced and the story, plot situations, comedy incidents, etc., are formulated and discussed.

The musical director sketches out the musical accompaniment as the various types of action and the various incidents are suggested. The music is generally of a descriptive character so that it blends in with the situation which will subsequently be pictorially depicted. In this manner, the musical director prepares the musical score which very often is merely a sequence of extracts or excerpts from well known musical compositions, such excerpts being appropriately connected by compositions of his own. The proper tempo at which the music is to be subsequently played is decided at this time.

After the story, incidents, music and sound effects have been decided upon, a complete scenario is written in continuity form covering the story. This scenario is subsequently broken down into individual scenes for the various artists or animators who will prepare the pictorial representations for such scenes. The individual scenes of the scenario are then distributed to each artist. This scenario contains complete information regarding the action of the scene to be depicted. The artist or animator is also supplied with the musical score that will accompany the scene.

Figure 2:
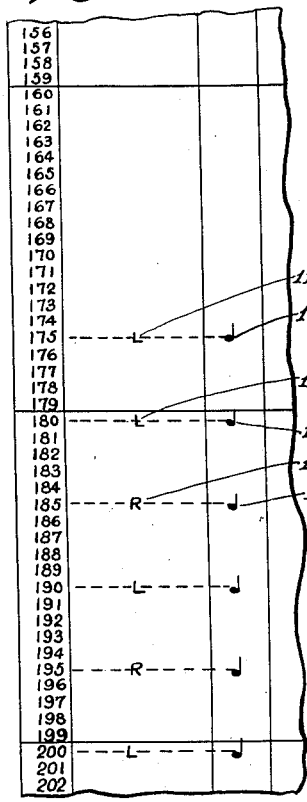
Fig. 2 is a portion of a synchronization sheet upon which the story or action being depicted in the animated cartoon is plotted out in sequence or scenes.

A synchronization sheet or exposure sheet is then prepared, a portion of such synchronization sheet or exposure sheet being indicated in Fig. 2. It is by means of this synchronization sheet that the artist is permitted to prepare a motion picture film which will eventually be precisely synchronized with the musical accompaniment.

Knowing the number of feet of film which each particular scene is to cover, the artist knows the number of individual drawings which he must make for that scene. There are 16 frames in one foot of 35 millimeter film so that for a ten foot scene the artist must provide 160 pictures. It is understood that the action may be repetitive in parts, so that certain sequences of steps may be used repeatedly, obviating the necessity of redrawing such sequences.

The work sheet or synchronization sheet or exposure sheet carries a succession of numbers, a number being thus allocated to each frame or picture to be produced or used. As shown in Fig. 2, the portions of the exposure sheet there depicted corresponds to frames or pictures 156 to 201 corresponding to a length of finished film of about two and one-half feet. The animator or artist also knows that the standard speed of projection is 24 frames per second and he thus distributes his action in such manner that when projected at the rate of 24 frames per second, the action will not show flicker but instead will move or appear to move in a smooth and flowing manner.

Figure 1:
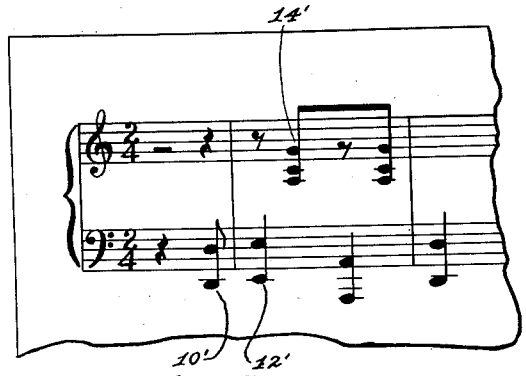

The artist or animator also has before him the musical score and tempo which the musical director has selected for the particular scene which the artist is to pictorially represent in his pictures. Let us assume, for example, that the series of pictures is to represent a character playing a piano and that the musical score in Fig. 1 is to furnish the musical accompaniment of the finished animated cartoon films. Let us furthermore assume that the first note will not be struck until frame 175 is reached. The animator allocates a musical notation or other identifying mark to the frame 175 on his exposure sheet Fig. 2.

For example, the animator may place the musical note 10 on the exposure sheet indicated in Fig. 2 opposite number 175. He may also indicate by the letter L opposite the number 175 that such note or notes or chord are played with the left hand as indicated at 11. He may then decide the number of frames which will be allotted to the raising of the hand and again striking the piano keyboard and may decide that this beat or action will require 5 frames so that he places the second musical symbol or other mark denoting the presence of musical accompaniment at 12 opposite frame 180. He may again indicate as shown at 13 that this musical accompaniment is also to be played with the left hand. Having established the timing required, he then places the musical beats wherever they are required by the music before him. Having decided that 4 frames separate the musical beats 10 and 12, the succeeding musical notation indicated at 14 will be placed opposite frame 185, thus leaving four frames between the previous musical notation 12 and the musical notation 14. He may also indicate as shown at 15 that such music is to be depicted as being played with the right hand of the character. The animator knows that the musical note to be played in frame 185 is to be played with the right hand inasmuch as the musical score in front of him (Fig. 1) shows a chord 14' in the treble. The preceding chord 12' was in the bass.

In the preceding paragraph it is stated that the animator establishes the tempo by allocating the number of frames consumed in action between successive notes of the musical score. This operation can be reversed, however, and the tempo may be predetermined by the musical director before the animator prepares his series of pictorial representations.

In this manner, the entire exposure sheet is prepared. It will be seen that although 16 frames constitute a foot of film and 24 frames constitute a full second of projection, the bar of music indicated in Fig. 1 will cover 20 frames. The succeeding bars may take 20 frames, 22 frames or 18 frames, or any other desired number of frames, depending upon the spirit of the scene being depicted, (or the tempo required by the music).

For example, the character may start playing very slowly and then gradually increase his speed.

The time required for projecting 24 frames is constant; the number of frames per foot of film is constant; but the speed of action pictorially depicted in the film may vary and simultaneously the speed or tempo of the musical accompaniment may vary. It will be noticed, however, that in the action depicted between frames 176 to 180, for example, there is a sequence of progressive steps of action which will have to be depicted. This sequence will, in the illustration given, consist of progressive steps of raising the character's hand and then placing it down upon the piano keyboard so as to complete one movement. The musical accompaniment or sound effect is correlated with the termination of such sequence of progressive steps of a fragment of action. If, for example, a character were to jump from a cliff into a body of water, the animator would depict the sequence of progressive steps illustrating this action and the sound accompaniment would probably consist of a noise simulating a splash which would be synchronized with the completion of this sequence of steps; in other words, such sound would be synchronized with the final pictorial representation which depicts the character striking the water. Of course, intermediate sound effects may also be provided such as, for example, the switch of the character through the air before he strikes the water.

After the exposure sheet or work sheet has been prepared, as shown in Fig. 2, the animator can then prepare his series of pictorial representations. The preparation of the drawings may be accomplished in a number of different ways and it is not necessary to go into the detail of this particular step.

In the method being described, it will be noted that in effect the action is being synchronized to the predetermined music. The method of this invention is not limited to this sequence of steps, however, as musical beats and music can, if desired, be synchronized to a predetermined series of progressive steps of action as will be explained hereinafter.

Figure 3:
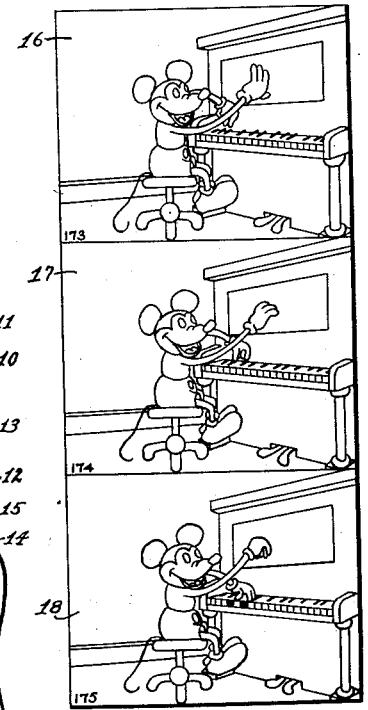
Fig. 3 represents a series of drawings of progressive steps of action, such drawings being correlated with the synchronization sheet.

The animator, therefore, prepares a series of drawings or pictorial representations suitable for photographing purposes, each of said drawings being correlated with a frame number appearing on the exposure sheet or work sheet shown in Fig. 2. For example, the drawings shown in Fig. 3 and numbered 16, 17 and 18 are thus prepared, these three drawings being correlated to frames 173, 174 and 175 showing the character striking the piano with his left hand in frame 175 or picture 18. The completed series of drawings prepared as above described, may then be photographed.

It is to be understood that whenever desired certain sequences of drawings may be repeatedly used. A stop motion camera is employed so that each of the drawings is separately photographed in its proper sequence. A continuous film is thus obtained showing the action which has been desired.

The sound accompaniment must be recorded in absolute synchronization with the motion picture film which carries photographic impressions of the drawings made by the animator. By referring to the exposure sheet or work sheet shown in Fig. 2, it may be found that there is no sound effect, for example, between frames 156 to 174 but that the initial sound recording is to take place in synchronism with frame 175.

It is desirable that the tempo of the musicians who will play the music which is to be synchronized with the film be identical to the tempo which the pictorially depicted character employed in the pictures. Furthermore, it is necessary to impart this tempo to the musicians in some silent manner and in a manner which will not detract their attention from the music.

Figure 4:
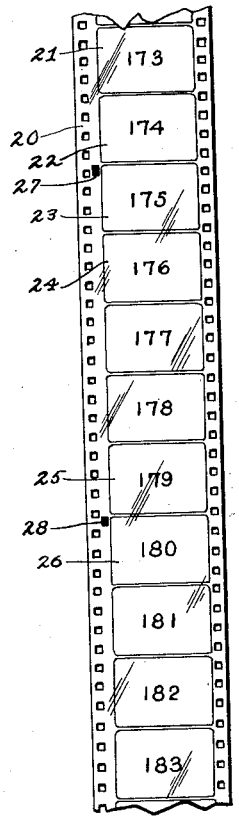
Fig. 4 is a motion picture film obtained by photographing the drawings illustrated in Fig. 3.

This difficulty may be solved in a number of different ways but preferably by indicating to the musician or musicians the moments at which they are to produce sounds, by the application of force thereto, as by tapping or touching them or by pressure. Localized sound waves may be caused to impinge upon their ear drums. Such aural indication of timing may be produced as follows, for example: a strip of continuous film co-extensive with the film prepared by the animator, is obtained and beat creating marks are made in that portion of the film on which the sound record is normally placed. For example, Fig. 4 illustrates a piece of continuous film 20 on which the frames have been indicated in dotted lines. A frame corresponding to the 173d frame of the strip is indicated at 21, the 174th frame is indicated at 22, the 175th frame at 23, the 176th frame at 24, etc.; the 179th is indicated at 25, the 180th at 26.

Adjoining frame 175 indicated at 23 in Fig. 4 a mark or beat producing symbol 27 is formed in the sound track area adjoining the sprocket holes. The mark 27 may be merely painted on the film at this point and this point is selected as the first musical note 10' of the music shown in Fig. 1 and is indicated at 10 on the exposure sheet opposite frame 175. Similarly, another mark 28 is made opposite frame 180. A strip of film is thus marked, the position of the sound producing indices on such strip of film 20 being dependent entirely upon the position of the sound beats indicated on the exposure sheet Fig. 2. If the film shown in Fig. 4 is now run through an ordinary projector provided with sound reproducing devices, said projector being operated at the standard projection speed of 24 frames per second, the sound generated would consist of a series of notes or sounds in perfect timed relation to the picture film depicting the action which the artist had produced from his exposure sheet. The beats indicating tempo need not be carried on film, but instead be on any desired type of record such as a wax or composition record. These clicks, beats or timed sounds may now be transferred to the orchestra, conductor, musicians or other sound generating sources in the following manner: Fig. 5 diagrammatically represents a projecting machine or a sound reproducing machine 30 in which the prepared film 20 is inserted as a reel 31. This film may pass through an aperture plate 32 through which light from a source 33 passes in the form of a suitable narrow beam. The light after passing through the film 20 and the aperture plate 32 may impinge upon a photoelectric cell 34. The film 20 will modulate the light passing through the aperture plate 32, depending upon the opacity of the film 20.

The photoelectric cell 34 will therefore be periodically activated or de-energized, depending upon the interposition of the opaque portions 27 and 28 and the varying electrical current thus produced may be amplified as by means of the amplifier 35 and then transmitted as by means of connectors 36 to a plurality of receiving means such as telephone head sets 37, 38 and 39. These head sets may be carried by the musicians or others who are producing the sound effects. In this manner, the musicians and others are properly instructed as to the timing without having their attention distracted from their music. Furthermore, inasmuch as the receivers 37, 38 and 39 are worn by the musicians, the sound reproduced by such receiving means 37, 38 and 39 is localized in its action to the musicians themselves and therefore the beat or tempo indicating sound is not superimposed upon the sounds created by the musicians. Therefore, the recording produced is free from extraneous noises such as the tempo signals.

When the tempo of the musical accompaniment is substantially constant for prolonged periods of time, an arrangement such as indicated in Figs. 6 and 7 may be employed. In the arrangement shown in Fig. 6, a metronome 40 may be positioned before a microphone 41, said metronome being carefully adjusted so as to indicate beats in proper timed relation, said beats corresponding in timed relation to the timing indicated on the work or exposure sheet described hereinabove. The electrical current impulses created by the microphone 41 may then be conveyed by the line 36 to a plurality of head sets 37, 38 and 39 worn by the musicians or other sound sources which it is desired to direct in producing a sound record synchronized with the motion picture film.

As shown in Fig. 7, the line 36' may lead to a switch 42, said line 36' including a source of electrical energy such as the apparatus 43. The switch 42 may then be periodically closed by means of a cam 44 and mounted on a shaft 45 driven as by means of gears 46 and 47 from some source of power such as, for example, a standard projection machine operating at standard speed, the switch 42 being thus closed in timed relation to the speed of the projection machine. The gears 46 and 47 may be varied so that the switch 42 is closed just as often as it is desired to create a time signal in accordance with the exposure sheet shown in Fig. 2.

Instead of aurally imparting the tempo to the musicians or to the conductor, any other method capable of imparting the tempo to the musicians by the application of a force in such manner that it is substantially silent, may be employed. For example, a device such as is shown in Fig. 8 may be used. This device may consist of a coil 50 having a solenoid 51 therein, said solenoid being provided with a spring 52 adapted to maintain said solenoid withdrawn in the coil. The coil may be carried by a strap or other fastening means 53 whereby the device may be attached to the arm, leg or ankle of a musician. The coil 50 may be connected by means of suitable electrical conductors indicated at 36'' to a source of current which is interrupted in any suitable manner, such interruptions being precisely timed in accordance with the desired tempo. For example, the conductors 36'' may be connected to the leads 36' of Fig. 7 so that whenever the cam 44 closes the circuit, the solenoid 51 will strike the musician, thus imparting to him the tempo desired.

Instead of aurally imparting the tempo to the musicians and instead of imparting the tempo to the musicians by the application of physical contact, as by means of the solenoid described hereinabove, the tempo may be imparted to the musicians by flashing small lights fastened on the stands of the musicians. A make-and-break device of the character shown in Fig. 7 may be employed for this purpose, the leads 36' leading to lamps on the stands of the musicians instead of to the ear phones 37', 38', 39', etc. Such flashing lights may be mounted in close proximity to the music, therefore not detracting the musicians' attention from the music or from the conductor.

It will thus be seen that a method of preparing animated cartoon films with sound accompaniment synchronized therewith has been prepared in which a predetermined musical score is correlated with a sequence of progressive steps of action which it is desired to depict pictorially by assigning consecutive numbers to the consecutive frames of the film which is to be prepared. Musical notations or suitable symbols denoting musical accompaniment are then allocated to those frames which are to be synchronous with said predetermined musical score and pictorial representations are prepared of progressive steps of action for each of such consecutively numbered frames. Preferably, the steps of pictorially depicted action terminate in representations correlated to frames to which musical notation has been allocated.

Such prepared pictorial representations are then photographed in consecutive order, the order being correlated to said consecutively numbered frames. The sound record of such musical score is then separately produced, the musical score during the projection of the sound record being timed with the frames of the film to which musical notation was originally allocated. The consecutive photographs of the pictorial representations are then combined with the sound record by well known methods of printing and developing.

Where the musical passages or sequences are extremely fast (when played according to the tempo which had been established), the musical score may be played at a predetermined slower tempo, the recording also being slowed down proportionately. When such slower recording is reproduced at the normal speed, there is only a slight increase in pitch, which can be compensated for by lowering the pitch of the musical instruments during such recording.

Although the method described hereinabove has been particularly described as it pertains to the synchronization of cartoon films with sound recordings carried on film, it will be understood that the method of this invention is also applicable to the synchronization of disc records or of recordings of any other desired type with a motion picture film.

It is to be understood that it is not necessary to employ all of the steps described hereinabove in combination. For example, an animated cartoon film may have been prepared originally and it is now desired to produce a musical accompaniment thereto. The recording of the musical accompaniment may therefore be made after the original film has been completed or instead the musical recording may be produced before the picture film is completed. As a result of the method described hereinabove, however, it is possible to precisely and accurately synchronize pictorial representations and the sound record and the method described hereinabove positively insures such synchronization whereas heretofore the methods employed were quite haphazard and involved great personal error.

The apparatus particularly described hereinabove can be modified very appreciably without departing from the spirit of this invention. It will be obvious, however, that by aurally indicating the beats or tempo to the musicians or others rendering said sound record, their attention is not distracted from their music and the quality of the record is thus vastly improved. In the past, some attempt has been made to indicate the tempo to the musicians by means of projected images of dancing balls or moving rods but in maintaining and changing the tempo, the musicians had to focus their attention upon the projected images and not upon their music. Such difficulties are, of course, obviated by the method and apparatus of this invention.

Those skilled in the art will recognize that certain changes and modifications may be made in the invention and all such changes and modifications as come within the scope of the appended claims are embraced thereby.

For example, a pre-existing sound recording may be utilized and an animated cartoon film produced for use with such pre-existing sound recording, by merely reversing the steps of the process disclosed hereinabove. The pre-existing sound recording may be analyzed so as to develop the tempo, and given the tempo, a score or work sheet may be prepared from which the animator may then prepare sequences of pictorial representations depicting actions terminating in frames correlated with the musical score.

We claim:

1. In a method of reparing animated cartoon films with sound accompaniment synchronized therewith, the steps of preparing a stationary chart correlating a predetermined musical score with a sequence of progressive steps of action which it is desired to depict pictorially by assigning and indicating on said chart designated drawings to successive frames of the film which is to be prepared, allocating and indicating on said chart musical notations in accordance with the predetermined musical score to those frames which are to be synchronous with said predetermined musical score; preparing pictorial representations of progressive steps of action for each of said successive frames, said steps of pictorially depicted action terminating in representations correlated to frames to which musical notation has been allocated, photographing said prepared pictorial representations in order designated on said chart and correlated to said successive frames, separately producing a sound record of said musical score, timing said musical score during recording with the frequency of musical notations allocated on said chart, and combining the consecutive photographs of pictorial representations with the sound record of said musical score.

2. In a method of preparing animated cartoon films with sound accompaniment synchronized therewith, the steps of preparing an elongated chart correlating a predetermined musical score with a sequence of progressive steps of action which it is desired to depict pictorially by assigning and designating on said chart consecutive numbers to successive frames of the film which is to be prepared, allocating a desired number of said numbered frames to each step of the desired action, allocating musical notations in accordance with the predetermined musical score to those frames which are to be synchronous with said predetermined musical score; preparing pictorial representations of progressive steps of action for each of said consecutively numbered frames, said steps of pictorially depicted action terminating in representations correlated to frames to which musical notation has been allocated, photographing said prepared pictorial representations in consecutive order correlated to said consecutively numbered frames, separately producing the sound record of said musical score, timing said musical score with the frames of the film to which musical notation was allocated, and combining the consecutive photographs of pictorial representations with the sound record.

3. In a method of preparing animated cartoon films with sound accompaniment synchronized therewith, the steps of preparing a preliminary work strip correlating a predetermined musical score with a sequence of progressive steps of action it is desired to pictorially depict by assigning and designating on said chart consecutive numbers to successive frames of the film which is to be prepared, allocating a desired number of frames to each step of the desired action, allocating symbols to those frames which depict final steps of movements and are to be synchronous with said predetermined musical score, said symbols denoting beats in accordance with the predetermined musical score, preparing pictorial representations of the progressive steps of action for each of said consecutively numbered frames, said steps of pictorially depicted action terminating in representations correlated to frames to which beat symbols have been allocated, photographing said prepared pictorial representations in consecutive order correlated to said consecutively numbered frames to produce a continuous motion picture film, separately producing a sound record of said musical score, and combining the consecutive photographs of pictorial representations with the sound record.

4. In a method of preparing animated cartoon films with sound accompaniment synchronized therewith, the steps of preparing a chart correlating a desired musical score with action to be pictorially depicted by assigning and designating on said chart consecutive numbers to successive frames of the film to be prepared, allocating a desired number of frames to each step of the desired action, allocating musical notation to those frames which depict final steps of movement and are to be synchronous with the musical score, and then preparing pictorial representations for each of said consecutively numbered frames, the pictorial representations depicting progressive steps of action.

5. In a method of preparing motion picture films with sound accompaniment synchronized therewith, the steps of preparing a stationary chart by assigning and designating on said chart consecutive numbers to successive frames of a film to be made depicting progressive steps of action, allocating symbols denoting beats to those frames in which progressive steps of action terminate, making an action film in accordance with the action indicated upon the chart, and separately recording a musical score in timed relation to the frames indicated on said stationary chart to which beats have been allocated.

6. In a method of preparing animated cartoon films with sound accompaniment synchronized therewith, the steps of preparing a stationary chart by indicating thereon in which frames of a film bearing pictorial representation of progressive steps of action said steps terminate, separately forming a continuous sound record of a musical accompaniment for said film, and timing the beats of said musical accompaniment in accordance with those frames of said film indicated on said stationary chart in which progressive steps of action terminate by aurally indicating to musicians preparing said sound record without producing a sound capable of being recorded the timed relation of frames of said film in which steps of action terminate when said film is projected for exhibition, and finally combining the film bearing pictorial representations with the sound record thus produced.

7. In a method of preparing animated cartoon films with sound accompaniment synchronized therewith, the steps of (1) preparing a stationary chart on which a proposed action and a predetermined sound accompaniment are indicated and correlated with frames of a continuous film, said chart being prepared by providing upon said chart identifying marks indicating successive frames for a given series of action steps, allocating to certain of the frames indicated on said chart musical notations in accordance with the predetermined musical score, said musical notations being also correlated to the characteristics and the rapidity of the action to be depicted, and indicating on said chart the characteristics of the step of action to be depicted in selected frames whereby the tempo of the predetermined music and the action to be depicted within it indicate the successive number of frames correlated to said frames and speed of the film to be prepared therefrom, (2) preparing pictorial representations of progressive steps of action for each of said successive frames and identifying the same in accordance with the prepared chart, (3) photographing said pictorial representations in the order indicated upon the representations and on said chart to form a picture film (4) separately producing the sound record of the predetermined musical score timed in accordance with the chart notations, and (5) combining the picture film with the sound record.

8. In a method of preparing sound recordings synchronized with motion picture films, the steps including preparing a stationary chart having thereon consecutive numbers representing frames of a picture film to be made and also provided with markings correlated with certain numbers and designating culmination of action steps, making a series of pictures correlated with the chart and providing thereon numbers corresponding to the series on the chart, producing a film with the aforesaid pictures thereon in proper sequence, marking another strip of film to provide tempo markings at predetermined points corresponding with frames disclosing culmination of action steps on said first mentioned film, operating the tempo-marked film to impart tempo signals electrically to musicians and simultaneously preparing a sound film recording thereon sounds produced by said musicians upon receipt of the aforesaid tempo signals.

WALTER E. DISNEY.
WILFRED E. JACKSON.
WILLIAM E. GARITY.